No. 831,693. PATENTED SEPT. 25, 1906.
E. WISMAR.
SAW SET.
APPLICATION FILED OCT. 11, 1905.
2 SHEETS—SHEET 1.
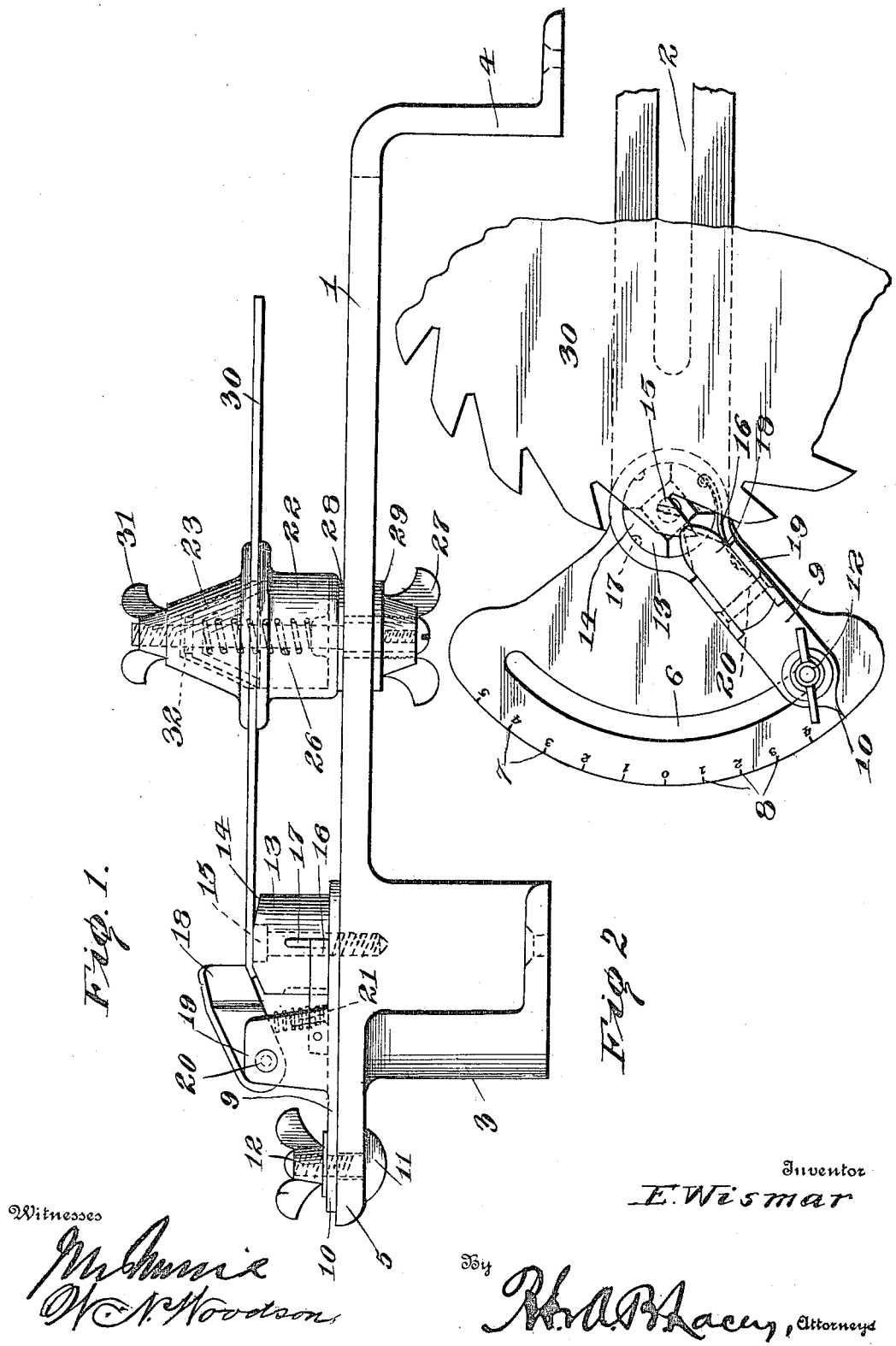
Inventor
E. Wismar
Witnesses
By
, Attorneys

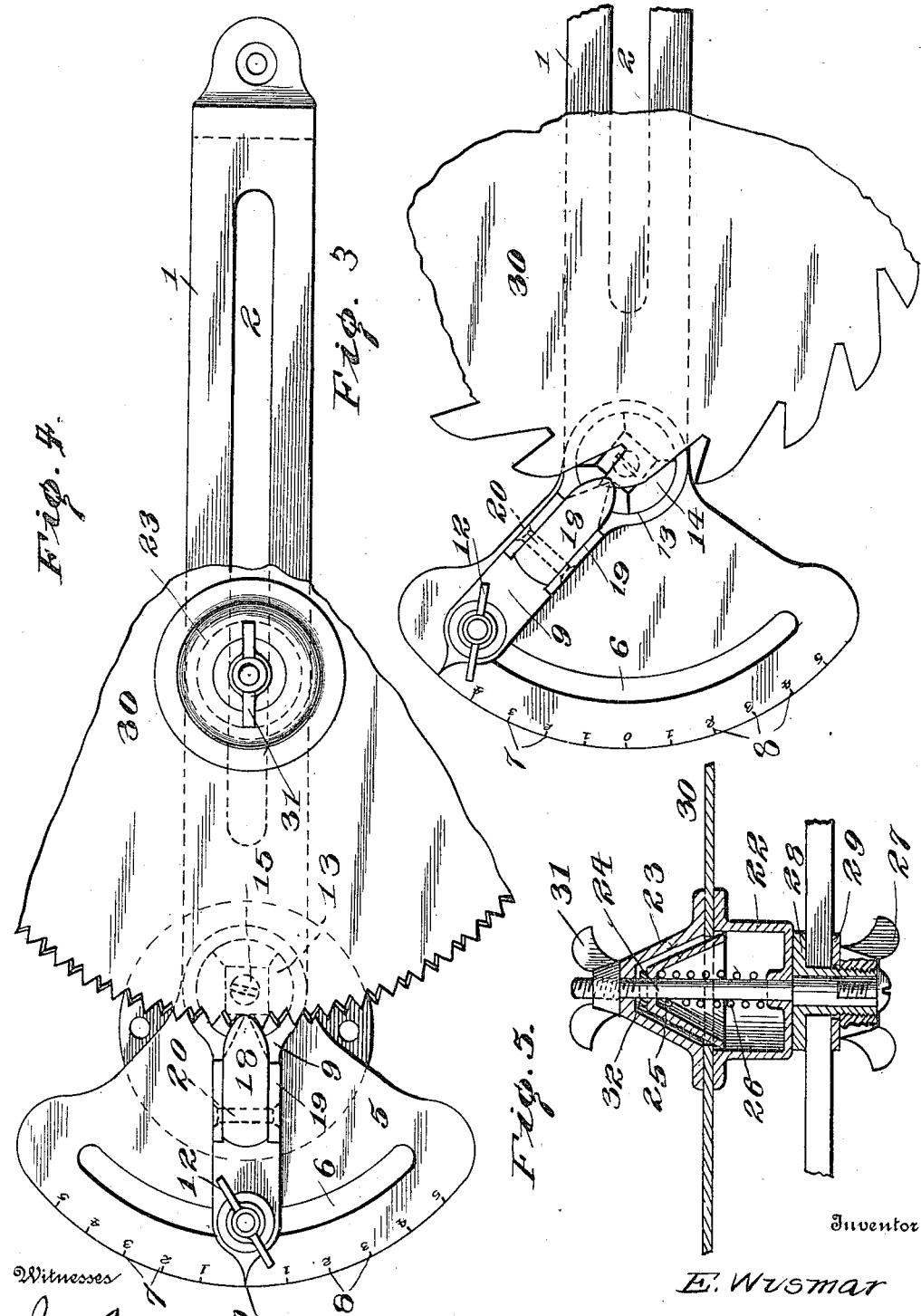

UNITED STATES PATENT OFFICE.

EMIL WISMAR, OF LOS ANGELES, CALIFORNIA.

SAW-SET.

No. 831,693.     Specification of Letters Patent.     Patented Sept. 25, 1906.

Application filed October 11, 1905. Serial No. 282,296.

*To all whom it may concern:*

Be it known that I, EMIL WISMAR, a citizen of the United States, residing at Los Angeles, in the county of Los Angeles and State of California, have invented certain new and useful Improvements in Saw-Sets, of which the following is a specification.

The present invention aims to provide means of novel formation designed chiefly for setting the teeth of circular saws, the primary purpose being to devise a tool adjustable in parts to admit of its ready adaptation to different sizes of saws and which will embody a scale to insure correct and accurate setting of the alternate teeth after the saw has been reversed.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a side view of a saw-set embodying the invention and showing the parts in operative position. Fig. 2 is a top plan view of an end portion of the tool, showing one extreme adjustment of the arm carrying the hammer and anvil. Fig. 3 is a view of the parts shown in Fig. 2, showing said arm at its opposite extreme adjustment and the saw reversed. Fig. 4 is a view similar to Fig. 2, showing the arm carrying the hammer and anvil intermediate of its extreme adjustment and a portion of a saw having its teeth universally inclined. Fig. 5 is a sectional view of the pivot-support for the saws, showing the parts on a larger scale Corresponding and like parts are referred to in the following description and indicated in all the views of the drawings by the same reference characters.

The device comprises a support for the operating parts, said support consisting of a plate 1, having a longitudinal slot 2 and provided at opposite ends with legs 3 and 4, terminating in feet which are apertured to receive suitable fastenings for attaching the tool to a bench, stand, or like structure. One end of the support is sector-shaped, as indicated at 5, and is formed with an arcuate slot 6 and two sets of scale-graduations 7 and 8, which are similarly numbered from a medial point outward in opposite directions. An arm 9 is mounted upon the sector-shaped support 5, so as to sweep thereover at its outer ends, which latter terminates in a point 10 for coöperation with the indications of the scale-graduations 7 and 8. A bolt or like fastening 11 operates in the slot 6 and passes through an opening near the outer end of the arm 9 and receives a set-nut 12, by means of which the arm 9 is firmly secured in the located position. An anvil 13 is concentric with the pivot-center of the arm 9 and is provided at its upper end with a plurality of faces 14, which are differently inclined to admit of the teeth of saws being variously set, according to the nature of the saw and the character of work for which intended. The anvil 13 preferably consists of a circular block mounted upon the upper portion of a machine-screw 15, let into the plate or bed 1 of the support, said machine-screw likewise serving as a pivot-fastening for the arm 9, which latter and the anvil are rotatable thereon in order to admit of the required angular adjustment being had. The anvil 13 is adapted to be turned either with the arm 9 or independent thereof, as may be required. A spring-dog 16 is adapted to coöperate with a series of grooves 17, formed in the sides of the anvil 13, so as to hold the latter in an adjusted position. One end of the dog 16 is attached to the arm 9 in any manner, whereas the opposite end is constructed to enter any one of the grooves 17 and secure the anvil against casual movement.

The hammer 18 is mounted upon the arm 9 and is adapted to coöperate with any face of the anvil 13 and may be supported in any manner. As shown, a pair of studs 19 are extended upward from the arm 9 and receive between them a hammer 18, which is mounted upon a pin 20, passed through transversely-alined openings formed in the hammer and the studs 19. A spring 21 is interposed between the hammer and arm 9 and normally exerts an upward pressure upon the hammer to hold it elevated and cause it to clear the saw, so as not to interfere with the free turning thereof when shifting from one tooth to another in the setting operation.

The pivot-support for the work or saw comprises a cup-shaped washer 22, conical washer 23, spindle 24, and self-adjusting center 25, the latter consisting of a hollow cone freely movable upon the spindle 24 and normally pressed upward by means of a spring 26, mounted upon the spindle 24 and housed by means of the parts 22 and 25. The spindle 24 is adjustable in the slot 2 of the support and is held in the located position by means of a set-nut 27, mounted upon its lower threaded end, the part 1 being confined between washers 28 and 29, mounted upon the lower portion of the spindle, the washer 29 being loose and the washer 28 fast.

It is to be understood that any suitable means may be employed for securing the spindle to the support which will admit of its adjustment and prevent casual displacement when made fast. The hollow washers 22 and 23 are outwardly flanged at their meeting edges to obtain an extended bearing upon the saw 30, clamped between them. The upper end portion of the spindle is threaded and receives a set-nut 31, by means of which the work is clamped between the washers. A nut 32 is mounted upon the upper threaded portion of the spindle above the centering-cone 25 to prevent upward displacement thereof when the set-nut 31 and washer 23 are removed to admit of placing a saw 30 in position or when removing it from the pivot-support. The upper face of the cup-shaped washer 22 is in the same plane with the upper face of the anvil 13, thereby admitting of a saw 30 resting squarely upon the part 13 and 22.

By having the pivot-support adjustable toward and from the anvil the arm 9, carrying the hammer 18, may occupy a fixed position with reference to the scale-graduation and the anvil, whereas the tool may be adapted to saws of different diameters. When the tool is to be adapted for setting the teeth of crosscut-saws or like work having the teeth uniformly sloped, the arm 9 is set to a neutral point between the scale-graduations 7 and 8, as indicated in Fig. 4, because the relation between the teeth of the saw and the hammer and anvil is the same in either position of the saw, as will be readily comprehended. In the event of a saw having inclined teeth the arm must be angularly adjusted to cause the hammer and anvil to operate squarely upon the points of the teeth.

In one position of the saw the arm 9 and adjunctive parts are moved, for instance, to the right, as indicated in Fig. 2, and when the saw is reversed to admit of setting the teeth intermediate of those previously set the arm 9 and corresponding parts are moved to the left, as shown in Fig. 3. The reverse graduation of the scale-indications admits of relatively adjusting the arm 9 and coöperating parts, so as to occupy the same relative position with reference to the teeth of the saw in either position of the latter, whether setting the alternate or the intermediate teeth. By reference to the scale-graduations the adjustment of the parts may be regulated to a nicety, so as to insure correspondence of setting of the teeth, thereby preventing undue strain upon the saw upon one side more than the other when in operation, as is the case when the setting of the teeth is not uniform. By mounting the anvil upon the arm 9 it occupies a fixed relation to the hammer when once adjusted, since said arm carries both the hammer and anvil when shifted from one position to another. Hence there is no necessity for changing the anvil when shifting the arm 9 from right to left or from left to right.

Having thus described the invention, what is claimed as new is—

1. In a tool of the class described, the combination of an adjustable support, an anvil adjustable with or independently of the support and having an operating-surface permitting of setting teeth at different angles, a pivot-pin for said support, the anvil being mounted upon said pin, and a hammer coöperating with the anvil.

2. In a tool of the class described, the combination of a support pivoted at one end thereof, means at the opposite end of the support for locking the same at a desired adjustment, an anvil mounted upon the pivoted end of the support, and a hammer pivoted intermediate of the ends of the support and coacting with the anvil.

In testimony whereof I affix my signature in presence of two witnesses.

EMIL WISMAR. [L. S.]

Witnesses:
R. P. HILLMAN,
BERTHA MAHLSTEDT.